US008175056B2

(12) United States Patent
Suh et al.

(10) Patent No.: US 8,175,056 B2
(45) Date of Patent: May 8, 2012

(54) METHOD AND SYSTEM FOR MANAGING MOBILITY IN A MOBILE COMMUNICATION SYSTEM USING PROXY MOBILE INTERNET PROTOCOL

(75) Inventors: Kyung-Joo Suh, Seoul (KR); Dae-Gyun Kim, Seongnam-si (KR); Beom-Sik Bae, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 923 days.

(21) Appl. No.: 12/200,071

(22) Filed: Aug. 28, 2008

(65) Prior Publication Data
US 2009/0059864 A1 Mar. 5, 2009

(30) Foreign Application Priority Data

Aug. 28, 2007 (KR) .................. 10-2007-0086658
Aug. 28, 2007 (KR) .................. 10-2007-0086788

(51) Int. Cl.
*G06F 15/16* (2006.01)
(52) U.S. Cl. ........ 370/331; 370/332; 370/328; 370/401; 370/338; 370/254; 455/445; 455/436; 455/433; 709/338; 709/245
(58) Field of Classification Search .................. 370/331
See application file for complete search history.

(56) References Cited

U.S. PATENT DOCUMENTS

| 6,961,571 | B1* | 11/2005 | Rune et al. ................... 455/442 |
| 8,050,222 | B2* | 11/2011 | Maeda et al. ................. 370/329 |
| 2006/0209759 | A1 | 9/2006 | Vesterinen |
| 2007/0064654 | A1 | 3/2007 | Heller |
| 2007/0076663 | A1* | 4/2007 | Qi et al. ........................ 370/331 |
| 2011/0255515 | A1* | 10/2011 | Maeda et al. ................. 370/331 |

OTHER PUBLICATIONS

Yokota, Mobile IPv6 Fast Handovers for 3G CDMA Networks, Jun. 2008, pp. 1-22.*

* cited by examiner

*Primary Examiner* — Jeffrey Pwu
*Assistant Examiner* — Sulaiman Nooristany
(74) *Attorney, Agent, or Firm* — The Farrell Law Firm, P.C.

(57) ABSTRACT

A system is provided for managing mobility of an Access Terminal (AT) in a Proxy Mobile Internet Protocol (PMIP) communication system. As the AT performs a handoff, a target Signaling Radio Network Controller (SRNC) delivers session information of the AT, acquired from a source SRNC of a source network, to a target Access Network (AN). An Authentication, Authorization and Accounting server (AAA) performs an AT access authentication process. Then, a target Access Gateway (AGW) performs a proxy registration procedure, with the target AN, and receives, from the AT, a message indicating a need to establish an interface with the HA. A Home Agent (HA) performs mobility management for the AT, receives a message for requesting proxy registration for mobility management for the AT, sends an access request message to the AAA, receives an access accept message, and sends a response message for proxy registration to the target AGW.

14 Claims, 6 Drawing Sheets

METHOD AND SYSTEM FOR MANAGING MOBILITY IN A MOBILE COMMUNICATION SYSTEM USING PROXY MOBILE INTERNET PROTOCOL

PRIORITY

This application claims priority under 35 U.S.C. §119(a) to a Korean Patent Application filed in the Korean Intellectual Property Office on Aug. 28, 2007 and assigned Serial No. 2007-86788, and a Korean Patent Application filed in the Korean Intellectual Property Office on Aug. 28, 2007 and assigned Serial No. 2007-86658, the disclosures of both of which are incorporated herein by reference.

BACKGROUND OF THE INVENTION

1. Field of the Invention

The present invention relates generally to a mobile communication system, and in particular, to a method and system for managing mobility and a security process of an Access Terminal (AT) in a mobile communication system supporting Proxy Mobile Internet Protocol (IP).

2. Description of the Related Art

In conventional mobile communication systems such as 3$^{rd}$ Generation Partnership Project 2 (3GPP2) Code Division Multiple Access (CDMA) 1x and EVolution Data Only (EV-DO) systems, an Access Network (AN) manages radio-related resources, and a Packet Data Serving Node (PDSN), which is a separate entity of a Core Network (CN), performs a procedure associated with packet data communication.

The above-stated conventional mobile communication system provides mobility using Mobile Internet Protocol version 4 (MIPv4) and/or Mobile IPv6 (MIPv6) in the mobile environment of ATs. However, the conventional Mobile IP methods are unsuitable for intact use in an Ultra Mobile Broadband (UMB) scheme, which is an improved 3GPP2 scheme aimed at sending a larger volume of data at a higher transmission rate. Therefore, Proxy Mobile IP (Proxy MIP) is under discussion as one of the schemes capable of efficiently supporting UMB. Meanwhile, not only when an AT moves within the UMB network, but also when the AT moves between networks using different network access technologies, e.g., between the UMB network and a Worldwide Interoperability for Microwave Access (WiMAX) network, there is a need for a scheme capable of efficiently supporting mobility of the AT using Proxy MIP, i.e., the conventional MIPv4 method used in the CDMA 1x or EV-DO system requires a long time for access/call processing. In other words, Mobile IP, compared with Simple IP, can provide mobility, but may suffer from a time delay due to the security process, call processing process, and database management for mobility support, in its access/call processing and security processes. Therefore, there is a need for a technology for resolving these problems.

SUMMARY OF THE INVENTION

An aspect of the present invention is to address at least the problems and/or disadvantages and to provide at least the advantages described below. Accordingly, an aspect of the present invention is to provide a method and system for supporting high mobility for an AT and performing secure and efficient communication for the AT by using Proxy MIP and an Authentication, Authorization and Accounting (AAA) server in an evolved mobile communication system, including 3GPP2 UMB.

Another aspect of the present invention is to provide a method and system for managing mobility of an AT through a Proxy MIP-based handoff technology not only when the AT moves within 3GPP2 UMB but also when the AT moves between different wireless access technologies, i.e., between different access networks.

Further another aspect of the present invention is to provide a method and system for efficiently performing mobility management for an AT using Proxy MIP and AAA server in a handoff situation of a mobile communication system.

Further another aspect of the present invention is to provide a method and system for supporting mobility and authentication using AAA-based Remote Authentication Dial-in User Service (RADIUS) or Diameter protocol, AAA server and Proxy MIP on an assumption that a mobile communication system uses an Extensible Authentication Protocol (EAP) or a security framework for access accept of an AT.

According to one aspect of the present invention, there is provided a method for managing a mobility of an Access Terminal (AT) in a mobile communication system using a Proxy Mobile Internet Protocol (PMIP). The method includes, as the AT performs a handoff from a source network to a target network, delivering, by a target Signaling Radio Network Controller (SRNC) of the target network, session information of the AT, acquired from a source SRNC of the source network, to a target Access Network (AN) of the target network; performing an access authentication process between the AT and an Authentication, Authorization and Accounting server (AAA); after the access authentication process, performing, by the target AN to which the AT will perform a handoff, a proxy registration procedure for establishing a PMIP interface, with a target Access Gateway (AGW) of the target network; sending, by the AT, to the target AGW an interface establishment triggering message indicating a need to establish an interface between the target AGW and a Home Agent (HA); sending, by the target AGW, a message for requesting a proxy registration to the HA for mobility management for the AT; sending, by the HA, an access request message associated with PMIP establishment to the AAA; receiving, by the HA, an access accept message from the AAA in response to the access request message; and sending, by the HA, a response message for the proxy registration, to the target AGW, in response to the message for requesting proxy registration.

According to another aspect of the present invention, there is provided a system for managing mobility of an Access Terminal (AT) in a mobile communication system using a Proxy Mobile Internet Protocol (PMIP). The system includes a target Signaling Radio Network Controller (SRNC) for, as the AT performs a handoff from a source network to a target network, delivering session information of the AT, acquired from a source SRNC of the source network, to a target Access Network (AN) of the target network; an Authentication, Authorization and Accounting server (AAA) for performing an access authentication process with the AT; a target Access Gateway (AGW) of the target network for, after the access authentication process, performing, with the target AN, a proxy registration procedure for establishing a PMIP interface, and receiving from the AT an interface establishment triggering message indicating a need to establish an interface with an HA; and the Home Agent (HA) for performing mobility management for the AT, receiving from the target AGW a message for requesting a proxy registration for mobility management for the AT, sending an access request message associated with PMIP establishment to the AAA, receiving an access accept message in response to the access request message, and sending a response message for the proxy registration to the target AGW in response to the message for requesting the proxy registration.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

The present invention provides a method for managing mobility of an AT using Proxy MIP in a mobile communication system. Although a detailed description of the present invention will be made herein with reference to a 3GPP2-based UMB system, by way of example, the present invention can be applied, not only in a UMB system, but also in an evolved WiMAX system, or an Evolved Packet Core (EPC) system, which is an evolved 3GPP mobile communication system.

Figure 1:
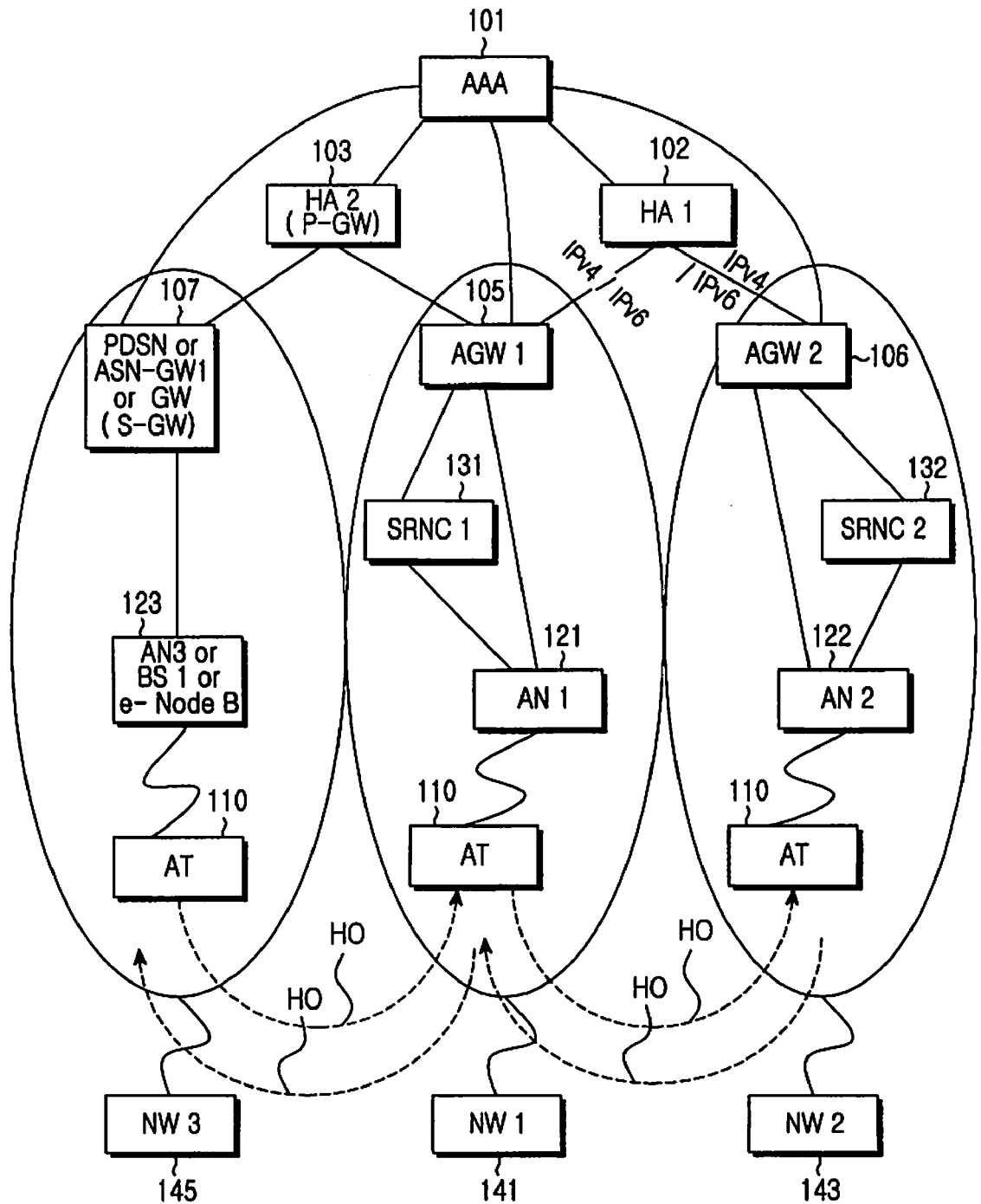
FIG. 1 is a block diagram illustrating a mobile communication system environment and its overall operation according to a preferred embodiment of the present invention.

The mobile communication system, according to an embodiment of the present invention, can be applied even for the case where an AT moves between networks employing different wireless access technologies such as 3GPP2-based UMB, WiMAX, and 3GPP-based Long Term Evolution (LTE), as shown in FIG. 1. Therefore, it is clear that the present Internet communication method, based on Proxy MIP and AAA in the mobile communication system, can be applied even in other mobile communication systems supporting similar technical backgrounds and channel formats, with only a slight modification, and without departing from the scope of the present invention.

FIG. 1 is a block diagram illustrating a mobile communication system environment, and an overall operation of the mobile communication system, according to a preferred embodiment of the present invention. FIG. 1 shows a combined network configuration of 3GPP2 UMB, WiMAX and 3GPP LTE, by way of example.

Referring to FIG. 1, an Access Network (AN) (AN1 121 or AN2 122) establishes a wireless connection to an Access Terminal (AT) 110 located in the service area or cell of the AN to perform communication through the wireless connection, and communicates with an Access Gateway (AGW) (AGW1 105 or AGW2 106, respectively) via a Signaling Radio Network Controller (SRNC1 131 or SNRC2 132, respectively). The AN1 121 (or AN2 122, respectively) is also known as a base station, and the AT 110 refers to a user device that accesses a packet data network, such as the Internet, for example, through the AGW1 105 (or AGW2 106, respectively) via the AN1 121 (or the AN2 122, respectively).

The AGW1 105 (or AGW2 106, respectively) includes therein a Foreign Agent (FA) function (not shown) that serves to connect the AT 110 to the packet data network when the AT 110 having another network as its home network has moved to a service area of a NetWork (NW) (NW1 141 or NW2 143, respectively) which is managed by the AGW1 105 (or the AGW2 106, respectively).

The major network entities of the packet data network, shown herein, include Home Agents (HAs) 102 and 103 that perform mobility management for the AT, and an Authentication, Authorization and Accounting server (AAA) 101 that performs an access authentication process with the AT.

Between the AN1 121 (or AN2 122, respectively) and the AGW1 105 (or AGW2 106, respectively), and between the SRNC1 131 (or SRNC2 132, respectively) and the AGW1 105 (or the AGW2 106, respectively) exists an interface or data path for managing mobility of the AT 110. The AT 110 has an IP protocol stack, and mobility management of the AT 110 can be performed by Proxy Mobile IP (PMIP).

In FIG. 1, an NW3 145 can be any one of WiMAX, UMB and 3GPP networks, and the NW3 145 can be composed of a network entity shown by reference numeral 107, a network entity shown by reference numeral 123, and an Access Terminal (hereinafter AT) 110. The network entity 107 can include at least one of PDSN, Access Service Network-Gateway 1 (ASN-GW1), and Gateway (GW; or Serving Gate way (S-GW)), and the network entity 123 can include at least one of Base Station 1 (BS1), Access Network 3 (AN3), and Evolved-Node B (e-Node B).

The AT 110, which was in the coverage area of the NW1 141, can move to the NW2 143, which is a UMB network, or to the NW3 145, which can be a heterogeneous network or a UMB network, through a handoff. The NW1 141 and NW2 143, as described above, are composed of the AGW1 105 (or AGW2 106, respectively) and the AN 1121 (or the AN2 122, respectively); and the AGW1 105 of the NW1 141 can share the HA2 103 with the NW3 145 and can also share the HA1 102 with the AGW2 106 of the NW2 143. Meanwhile, although the PDSN or ASN-GW1 107 of the NW3 145 can share the HA2 103 with the AGW1 105 of the NW1 141, a detailed description thereof will be omitted herein.

It will be assumed herein that the AGW1 105 of the NW1 141 shares the HA1 102 with the AGW2 106 of the NW2 143. In addition, the HA2 103 can serve as a Packet Data Network GateWay (P-GW or PDN-GW) in the 3GPP network. Between the HA1 102 and the AGW1 105, or between the HA1 102 and the AGW2 106 is formed as an Internet Protocol Version 4 (IPv4) or an Internet Protocol Version 6 (IPv6) network according to the network configuration of the service provider. In particular, if the network-based AT's mobility support, i.e., PMIP, is supported, PMIP Version 4 (PMIPv4) or PMIP Version 6 (PMIPv6) can be supported between the HA1 102 and the AGW1 105.

In the present invention, an interface for context transfer is supported between the AGW1 105 and the AGW2 106.

When the AT 110 moves from the NW1 141 to the NW2 143, the NW1 141 shares the HA1 102 with the NW2 143, and the AGW1 105 of the NW1 141 knows that the AGW105 will use the HA1 102 for registration of the AT 110 through the interface with the AAA 101. The AGW2 106 of the NW2 143, to which the AT 110 has moved, receives, through the AAA 101, information including at least one of a Home Network Prefix (HN-Prefix) and a Proxy-Care of Address (Proxy-CoA), which is a temporary address in the AGW1 105 where the AT 110 was located before the AT 110 moves. Upon receipt, the AT 110 can rapidly perform a registration procedure while maintaining the session, even when the AT 110 moves to another network. In the following description, a prefix 'source' will be attached to the entities of the network that the AT 110 accessed and was receiving services therefrom before the AT 110 performs a handoff, and a prefix 'target' will be attached to the entities of the target network to which the AT 110 performs a handoff.

First Embodiment

Figure 2:
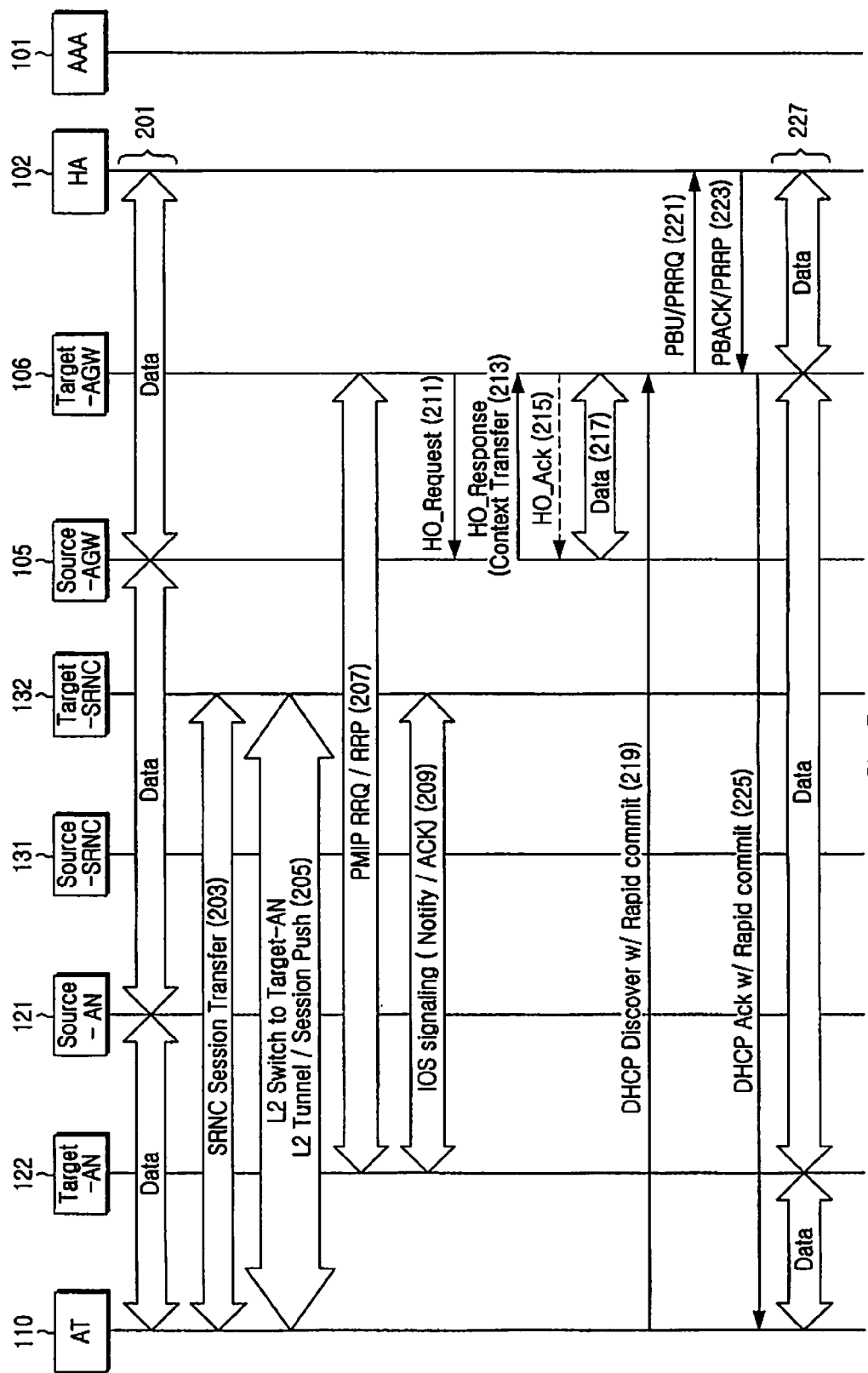
FIG. 2 is a message flow diagram illustrating a mobility management procedure for an AT under a PMIPv4 environment according to a first exemplary embodiment of the present invention.
Figure 3:
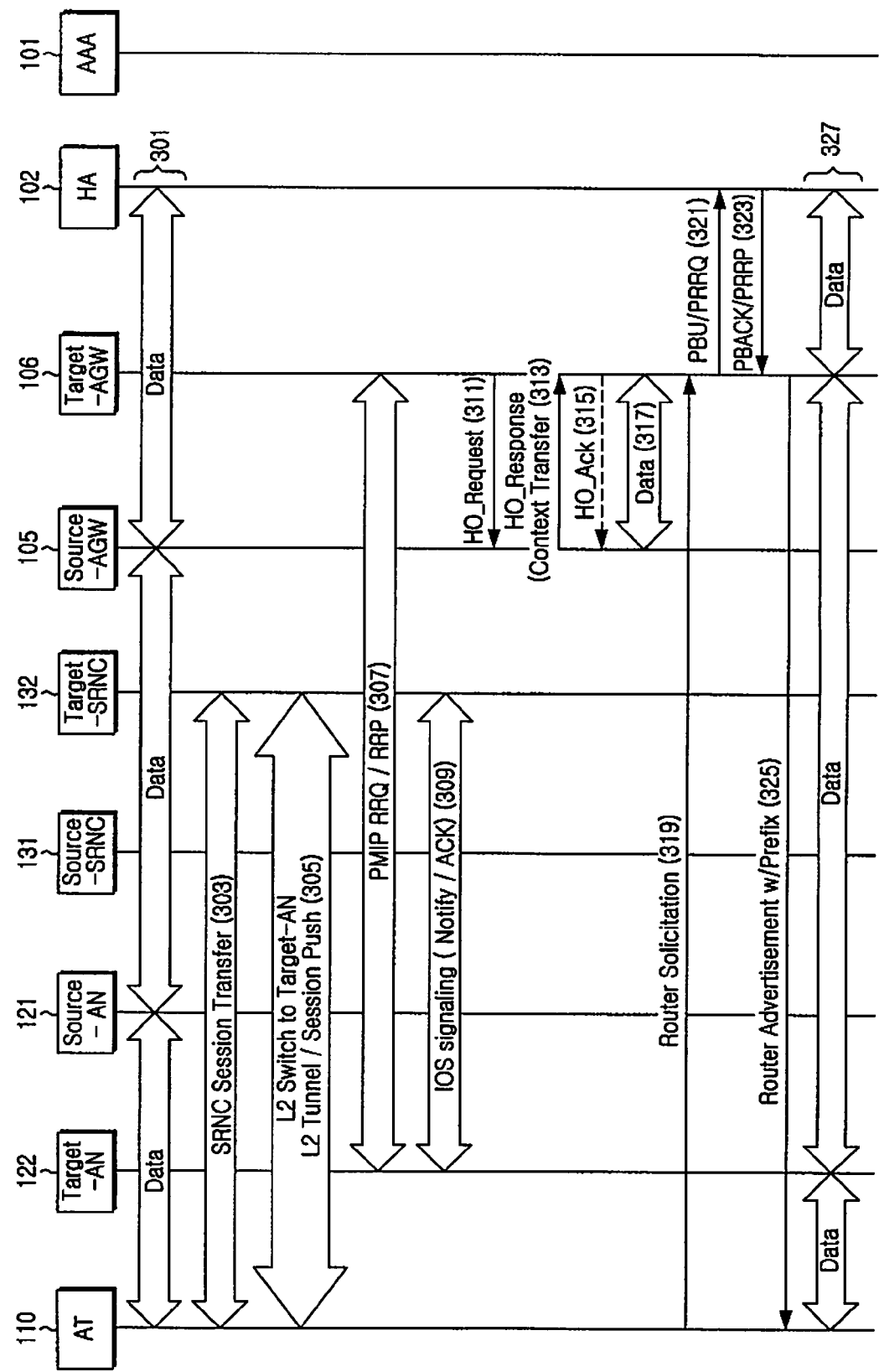
FIG. 3 is a message flow diagram illustrating a mobility management procedure for an AT under a PMIPv6 environment according to the first exemplary embodiment of the present invention.

With reference to FIG. 2 and FIG. 3, a detailed description will now be made of a context transfer method according to a first exemplary embodiment of the present invention. The AT 110 can perform a handoff from the NW1 141 to the NW2 143, and vice versa, or can perform a handoff from the NW1 141 to the NW3 145 and vice versa.

FIG. 2 is a message flow diagram illustrating a mobility management procedure for an AT under a PMIPv4 environment according to the first exemplary embodiment of the present invention. Although FIG. 2 shows an example where the AT 110 performs a handoff from the NW1 141 to the NW2 143 in FIG. 1, the present invention can be applied to environments where similar mechanisms are used, i.e., to any environment where PMIP and an inter-AGW interface for context transfer are supported.

Referring to FIG. 2, AT 110, Source-AN 121, Source-AGW 105, and HA 102 communicate in step 201. In case of a UMB scheme, the entities perform data communication through a Generic Routing Encapsulation (GRE) tunnel between the Source-AGW 105 and the Source-AN 121.

In step 203, if the AT 110 requests Target-SRNC 132 to include Target-AN 122 in an active set, the Target-SRNC 132 fetches session information from Source-SRNC 131.

In step 205, the AT 110 performs Layer-2 Fast Switching to the Target-AN 122, and the data transmission continues between the Target-AN 122 and the Source-AN 121 through a Layer 2 Tunnel Protocol (L2TP) tunnel. Thereafter, the Target-SRNC 132 sends the session information to the Target-AN 122.

In step 207, for a signaling interface between the Target-AN 122 and Target-AGW 106, the Target-AN 122 sends a Proxy Registration Request (Proxy RRQ or PRRQ) message to the Target-AGW 106, and the Target-AN 122 receives a Proxy Registration Response (Proxy RRP or PRRP) message from the Target-AGW 106, thereby setting information necessary for further data communication, for example, a GRE key.

In step 209, the Target-AN 122 notifies an address of the Target-AGW 106 and a GRE key to the Target-SRNC 132 or the Source-AN 121, and the Target-SRNC 132, or the Source-AN 121, sends an ACKnowledgement (ACK) message to the Target-AN 122 in response to the notification.

In step 211, the Target-AGW 106 sends a Handoff Request (HO_Request) message to the Source-AGW 105. In this case, the Target-AGW 106 can include, in the HO_Request message, information indicating which context information the Target AGW 106 will request, or a GRE key to be used for data communication mapping with the AN. A format and option type of the message used for the handoff request will be described later.

In step 213, the Source-AGW 105 sends a Handoff Response (HO_Response) message including a Context Transfer to the Target-AGW 106 in response to the HO_Request message. A format and option type of the HO_Response message used for the context transfer will be described later.

In step 215, which is an optional step, the Target-AGW 106 can send a Handoff ACKnowledgement (HO_Ack) message to the Source-AGW 105 according to whether the context transfer has been normally made or whether there is any additionally requested information.

In step 217, packets are delivered through the interface established in steps 213 to 215 between the Source-AGW 105 and the Target-AGW 106.

In step 219, the AT 110, when using IPv4, sends a Dynamic Host Configuration Protocol (DHCP) Discover with Rapid Commit message, thereby notifying that an interface is established between the Target-AN 122 and the Target-AGW 106, and notifying that an interface between the Target-AGW 106 and the HA 102 should be established.

In step 221, the Target-AGW 106 sends, to the HA 102, a Proxy Binding Update (PBU) message or a PRRQ message as a message for requesting proxy registration, used for registering the movement of the AT 110, on behalf of the AT 110. The Target-AGW 106 determines whether the Target-AGW 106 will send the PBU or the PRRQ, depending on whether the network uses IPv4 or IPv6 as an interface between the Target-AGW 106 and the HA 102, i.e., when the network supports PMIPv4 as it uses IPv4, the Target-AGW 106 sends the PRRQ, and when the network supports PMIPv6 as it uses IPv6, the Target-AGW 106 sends the PBU.

In step 223, the Target-AGW 106 receives a response message for the proxy registration from the HA 102, in response to the message for requesting proxy registration. The Target-AGW 106 receives a Proxy Binding ACKnowledgement (PBAck) for IPv6, and a PRRP for IPv4.

In step 225, if the AT 110 is an IPv4 AT, the Target-AGW 106 includes a Home of Address (HoA) used in the Source-AGW 105 in a DHCP Acknowledgement with Rapid Commit message, and sends the message to the AT 110, thereby supporting a seamless service, even during a handoff of the AT 110. When the handoff procedure is completed, data communication through Target-AN 122, Target-AGW 106 and HA 102 is available in step 227, using the interface established through steps 203 to 225.

A description will now be made of a context transfer method for supporting a mobility management procedure for an AT according to the first exemplary embodiment of the present invention.

The entire format of a context transfer message according to the first exemplary embodiment of the present invention is as shown in Table 1. In the User Datagram Protocol (UDP) header, a message header for context transfer is added and information necessary for handoff is delivered through a message option.

In the following description, a length of each message is expressed in bytes, and the length will be represented in bits if needed.

TABLE 1

| UDP Header (8 bytes) |
| --- |
| Message Header |
| Message Option (variable) |

A header format of the context transfer message, as shown in Table 2, includes a Message Type field indicating a message type, such as HO_Request, HO_Response and HO_Ack, a Length field indicating a length of the message, and a Flag field for representing the necessary information in a flag value. In particular, the Flag field includes an R bit for resetting the next transaction IDentifier (ID), and an F bit indicating the last fragment. The header format further includes an AT's ID field including an AT's ID, a Transaction ID field for identifying a transaction, and a fragment ID field for identifying a fragment. Reserved fields are provided for future use.

TABLE 2

| Message Type (1 byte) | Length (2 bytes) | R | F | Flag |
| --- | --- | --- | --- | --- |
| Transaction ID (2 bytes) | AT's ID (16 bytes) Fragment ID (1 byte) Reserved Message Option | | Reserved | |

The added Message Option has a form of Type/Length/Value (TLV). Although only the GRE key, Network Access Identifier (NAI), PMIPv4 mobility state, and PMIPv6 Mobility state are mentioned as Message Options in the first exemplary embodiment of the present invention, LCP state, IPv4CP state, IPv6CP state and CCP state for Point to Point Protocol (PPP) state management, and information on header compression state, Quality of Service (QoS) state, TFTv4 State, TFTv6 state, and Vendor specific state should also be delivered as according to demands of each occasion. A detailed description of such information will not be provided herein.

A GRE Key option includes a GRE key and lifetime information of the GRE Key option as shown in Table 3.

TABLE 3

| Type (2 bytes) | Length (2 bytes) |
| --- | --- |
| GRE key (4 bytes) | |
| Lifetime (2 bytes) | Reserved (2 bytes) |

A NAI option includes NAI information as shown in Table 4, and the NAI information can be used together as key information with respect to mobility management and authentication for PMIP.

TABLE 4

| Type (2 bytes) | Length (2 bytes) |
| --- | --- |
| NAI (max: 70 bytes) | |
| | Reserved (2 bytes) |

In order to manage PMIP mobility, a PMIPv4 mobility option shown in Table 5 and a PMIPv6 mobility option shown in Table 6 can be used.

The PMIPv4 mobility option includes an HoA field indicating an AT's HoA, and an AGW ADDRess-serving (Addr-serving) field indicating a Proxy CoA in the Source-AGW 105, i.e., an address of the Source-AGW 105, and further includes a field indicating a Proxy CoA in the Target-AGW 106, a field for transmission of a PMIP related Key, and a lifetime field for a lifetime of a tunnel. As to the 'Proxy CoA' in the Source AGW or Target AGW, in PMIP, since the gateway issues a registration request on behalf of the AT, an address of the gateway is registered in a database of a binding cache for the AT, so an address of the Source or Target gateway is called a Proxy CoA. Meanwhile, there is a PMIP related Key field indicating a PMIP-related key, and a root key used for generating a PMN-AN-HA key, which is a key between AGW and e-BS, such as, for example, PMN-AN-RK, can be delivered in this field.

TABLE 5

| Type (2 bytes) | Length (2 bytes) |
| --- | --- |
| HoA (4 bytes) | |
| Home Agent (4 bytes) | |
| Source AGW Addr or Proxy CoA in serving AGW (4 bytes) | |
| Target AGW Addr or Proxy CoA in Target AGW (4 bytes) | |
| PMIP related Key (16 bytes: TBD) | |
| Lifetime (2 bytes) | Reserved (2 bytes) |

A field specified to manage PMIPv6 mobility includes a Home Network Prefix field, which is a field for delivering a Home Network Prefix to generate an address of an AT.

TABLE 6

| Type (2 bytes) | Length (2 bytes) |
| --- | --- |
| HoA (16 bytes) | |
| Home Network Prefix (max: less than 16 bytes) | |
| Home Agent (16 bytes) | |
| Proxy CoA-serving (16 bytes) | |
| Proxy CoA-Target (16 bytes) | |
| PMIP related Key (16 bytes: TBD) | |
| Lifetime (2 bytes) | Reserved (2 bytes) |

As shown in Table 7, there is an AAA attributes field for indicating an authentication state of an AT.

TABLE 7

| Type (2 bytes) | Length (2 bytes) |
| --- | --- |
| AAA attributes and VSAs (variables) | |

It is also possible to request information while sending an HO_Request, using a 'state request option' shown in Table 8, and it is possible to request information even through a HO_ACK message. A Requested States field is used for designating a state requested for context transfer.

TABLE 8

| Type (2 bytes) | Length (2 bytes) |
| --- | --- |
| Request States (2 bytes) | Reserved (2 bytes) |

As shown in Table 9, for error state management, a status code option can be managed, and a status code field for checking an error state is included.

TABLE 9

| Type (2 bytes) | Length (2 bytes) |
|---|---|
| Status Code (4 bytes) | |

It is possible to guarantee integrity of a message being delivered using authenticator options as shown in Table 10. The authenticator options can include a Security Parameter Index (SPI) including a security parameter index value, and an Authenticator field added for data integrity.

TABLE 10

| Type (2 bytes) | Length (2 bytes) |
|---|---|
| SPI (4 bytes: TBD) | |
| Authenticator (Variable: TBD) | |

FIG. 3 is a message flow diagram illustrating a mobility management procedure for an AT under a PMIPv6 environment according to the first exemplary embodiment of the present invention. Although it is shown in FIG. 3 that the AT 110 performs a handoff from the NW1 141 to the NW2 143 in FIG. 1, the present invention can be applied to the environments where similar mechanisms are used, i.e., to any environment where PMIP and an interface for context transfer are supported.

Referring to FIG. 3, AT 110, Source-AN 121, Source-AGW 105 and HA 102 communicate in step 301. In a case of a UMB scheme, the entities perform data communication through a GRE tunnel between the Source-AGW 105 and the Source-AN 121.

In step 303, if the AT 110 requests Target-SRNC 132 to include Target-AN 122 in an active set, the Target-SRNC 132 fetches session information from Source-SRNC 131.

In step 305, the AT 110 carries out L2 Fast Switching to the Target-AN 122, and data transmission continues between the Target-AN 122 and the Source-AN 121 through an L2TP tunnel. Thereafter, the Target-SRNC 132 sends session information to the Target-AN 122.

In step 307, for a signaling interface between the Target-AN 122 and Target-AGW 106, the Target-AN 122 sends a PRRQ to the Target-AGW 106, and receives a PRRP from the Target-AGW 106, thereby setting information necessary for further data communication, e.g., a GRE key.

In step 309, the Target-AN 122 notifies the Target-SRNC 132 or the Source-AN 121 of an address of the Target-AGW 106 and a GRE key, and the Target-SRNC 132 or the Source-AN 121 sends an ACK message to the Target-AN 122 in response to the notification.

In step 311, the Target-AGW 106 sends a HO_Request message to the Source-AGW 105. In this case, the Target-AGW 106 can include, in the HO_Request message, information indicating which context information the Target-AGW 106 will request, or a GRE key to be used for data communication with the AN. A format and option type of the message used for the HO_Request message follows Table 1 through Table 10.

In step 313, the Source-AGW 105 can send, to the Target-AGW 106, a HO_Response message with a Context Transfer, in response to the HO_Request message. A format and option type of the message used for the HO_Response message follows Table 1 through Table 10. In step 315, the Target-AGW 106 can send an HO_Ack message to the Source-AGW 105 according to whether the context transfer has been normally made or whether there is any additionally requested information, and this step is optional. In step 317, packets are delivered through the interface established in steps 313 to 313 or step 315 between the Source-AGW 105 and the Target-AGW 106.

In step 319, the AT 110, when using IPv6, sends, to the Target-AGW 106 a Route Solicitation message, to notify the Target-AGW 106 that an interface is established between the Target-AN 122 and the Target-AGW 106 and an interface between the Target-AGW 106 and the HA 102 should be established.

In step 321, the Target-AGW 106 sends, to the HA 102, a PBU or PRRQ message, as a message for requesting proxy registration on behalf of the AT 110, in order to manage mobility of the AT 110. The Target-AGW 106 determines whether the Target-AGW 106 will send the PBU or the PRRQ, according to whether the network of the service provider uses IPv4 or IPv6 as an interface between the Target-AGW 106 and the HA 102. In other words, when the network supports PMIPv4 as a network mobility support mechanism as the network uses IPv4, the Target-AGW 106 sends the PRRQ. Then, when the network supports PMIPv6 as a network mobility support mechanism, as the network uses IPv6, the Target-AGW 106 sends the PBU.

In step 323, the Target-AGW 106 receives, from the HA 102, a response message for proxy registration, in response to the message for requesting proxy registration. In this case, the Target-AGW 106 receives, for IPv6 a PBAck as the response message for proxy registration, and receives, for IPv4 a PRRP as the response message for proxy registration.

In step 325, if the AT 110 is an IPv6 AT, the Target-AGW 106 includes HN-Prefix information in a Router Advertisement message and sends the Router Advertisement message to the AT 110 so that the AT 110 generates the same address as the HoA that the AT 110 was using in the Source-AGW 105, thereby supporting a seamless service, even during a handoff of the AT 110.

When the handoff procedure is completed, data communication through Target-AN 122, Target-AGW 106 and HA 102 becomes available in step 327, using the interface established through steps 303 to 325.

Figure 4:
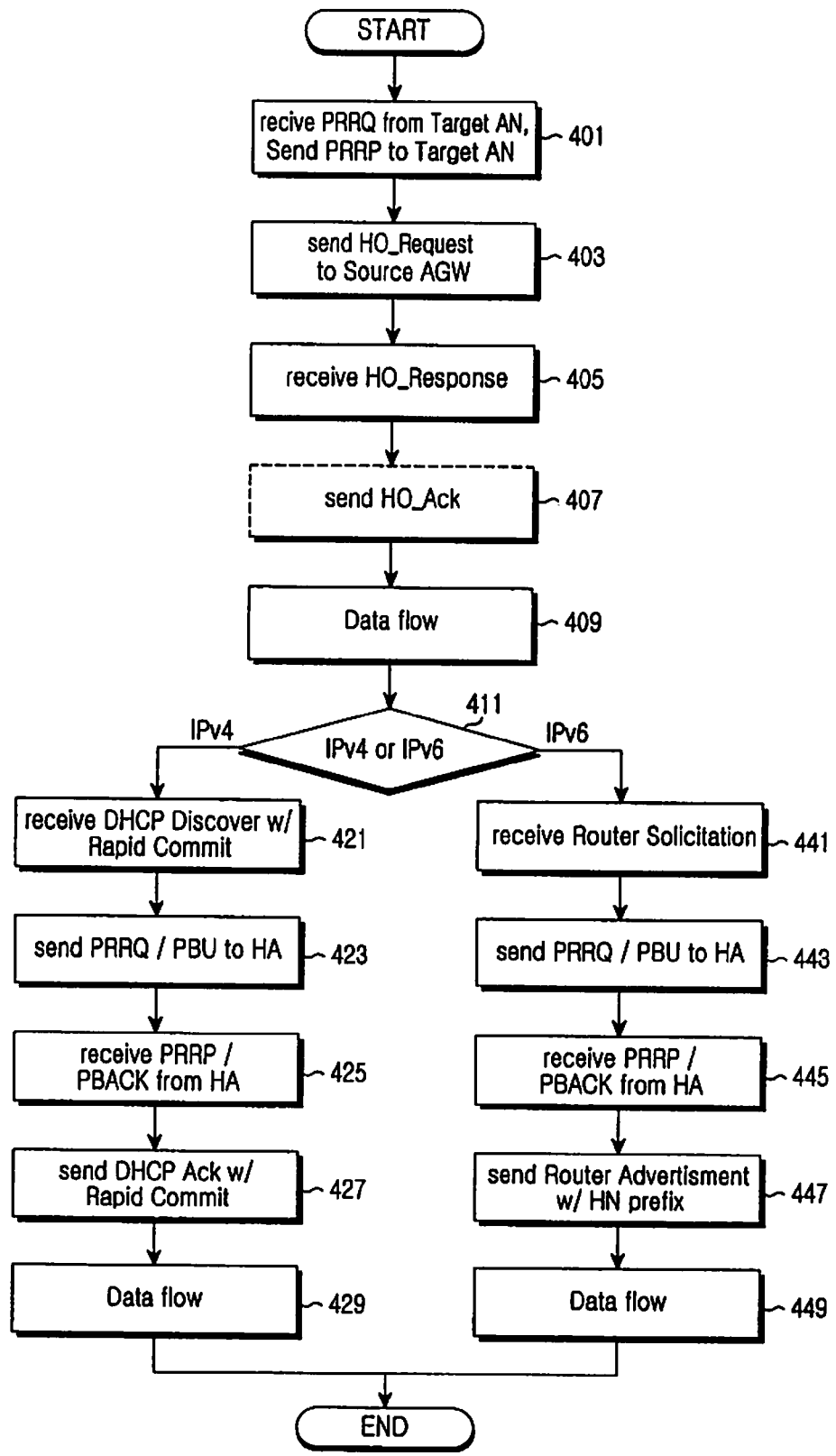
FIG. 4 is a flowchart illustrating an operation of a target AGW according to the first exemplary embodiment of the present invention.

FIG. 4 is a flowchart illustrating an operation of a target AGW according to the first exemplary embodiment of the present invention. It is assumed in FIG. 4 that "target AGW" refers to an AGW of the network to which an AT will move.

Referring to FIG. 4, in step 401, the Target-AGW 106 receives from the Target-AN 122 a PRRQ message for establishing a PMIP interface between the Target-AN 122 and the Target-AGW 106, and sends a PRRP message to the Target-AN 122 in response to the PRRQ message.

In step 403, the Target-AGW 106 sends a HO_Request message to the Source-AGW 105. In step 405, the Target-AGW 106 receives handoff-related information, through a HO_Response message, from the Source-AGW 105 (Context Transfer). In step 407, the Target-AGW 106 additionally requests information or sends a HO_Ack message in reply to the context transfer. In step 409, packets are delivered through an interface established between the Source-AGW 105 and the Target-AGW 106.

When a tunnel established as an interface is activated between the Target-AN 122 and the Target-AGW 106, the Target-AGW 106 determines, in step 411, a next step of the procedure according to whether the AT 110 uses IPv4 or IPv6. When the AT 110 uses IPv4, the Target-AGW 106 proceeds to step 421, where the AT 110 receives a DHCP Discover with Rapid Commit message sent by the AT 110, thus perceiving that an interface is established between the Target-AN 122 and the Target-AGW 106 and an interface between the Target-AGW 106 and the HA 102 should be established.

In step 423, the Target-AGW 106 sends, to the HA 102, a PBU or PRRQ message as a message for requesting proxy registration. The Target-AGW 106 determines whether the Target-AGW 106 will send the PBU or the PRRQ, according to whether the interface between the Target-AGW 106 and the HA 102 is IPv4 or IPv6. When the network supports PMIPv4 while using IPv4, the Target-AGW 106 sends the PRRQ, and when the network supports PMIPv6 while using IPv6, the Target-AGW 106 sends the PBU. In step 425, the Target-AGW 106 receives, from the HA 102, a PBAck (for IPv6) or a PRRP (for IPv4) as a response message for proxy registration in response to the message for requesting proxy registration.

In step 427, if the AT 110 is an IPv4 AT, the Target-AGW 106 sends to the AT 110 a DHCP Acknowledgement with Rapid Commit message with the HoA that the AT 110 was using in the Source-AGW 105, thereby supporting a seamless service, even during a handoff of the AT 110. When the handoff procedure is completed, data communication through Target-AN 122, Target-AGW 106, and HA 102 becomes available in step 429.

However, if the AT 110 is an IPv6 AT, the Target-AGW 106 proceeds from step 411 to step 441 where the Target-AGW 106 receives a Route Solicitation message sent by the AT 110, perceiving that a tunnel between the Target-AN 122 and the Target-AGW 106 is established and the Target-AN 122 should establish an interface between the Target-AGW 106 and the HA 102.

In step 443, the Target-AGW 106 sends, to the HA 102, a PBU or PRRQ message as, a message for requesting proxy registration for mobility management for the AT 110 on behalf of the AT 110. The Target-AGW 106 determines whether to send the PBU or the PRRQ, depending on the Target-AGW 106 uses IPv4 or IPv6 as an interface between the Target-AGW 106 and the HA 102. When the network supports PMIPv4 as the Target-AGW 106 uses IPv4, the Target-AGW 106 sends the PRRQ, and when the network supports PMIPv6 as it uses IPv6, the Target-AGW 106 sends the PBU.

In step 445, the Target-AGW 106 receives, from the HA 102, a PBAck (for IPv6) or a PRRP (for IPv4) as the response message for proxy registration in response to the message for requesting proxy registration.

In step 447, if the AT 110 is an IPv6 AT, the Target-AGW 106 includes a HN-Prefix in a Router Advertisement message and sends the message to the AT 110 so that the AT 110 generates the same address as the HoA that the AT 110 was using in the Source-AGW 105, thereby supporting a seamless service even during a handoff of the AT 110. When the handoff procedure is completed, data communication through Target-AN 122, Target-AGW 106 and HA 102 is available in step 449.

Second Embodiment

Although the AT 110 can perform a handoff from the NW1 141 to the NW2 143 and vice versa, or can perform a handoff from the NW1 141 to the NW3 145 and vice versa, a description of the second exemplary embodiment will be given with reference to FIG. 5 on an assumption that the AT 110 performs a handoff from the NW1 141 to the NW2 143.

The procedure performed when an AT performs a handoff to the target network can be summarized as follows. When the AT has entered from the source network to the target network, the source SRNC sends session information to the target SRNC at the request of the AT. Further, as the AT switches to the target AN, the target SRNC sends the session information to the target AN, and performs a proxy registration procedure for establishing a PMIP interface between the target AN and the target AGW. Then the target AN sends information about the target AGW to the target SRNC.

Figure 5:
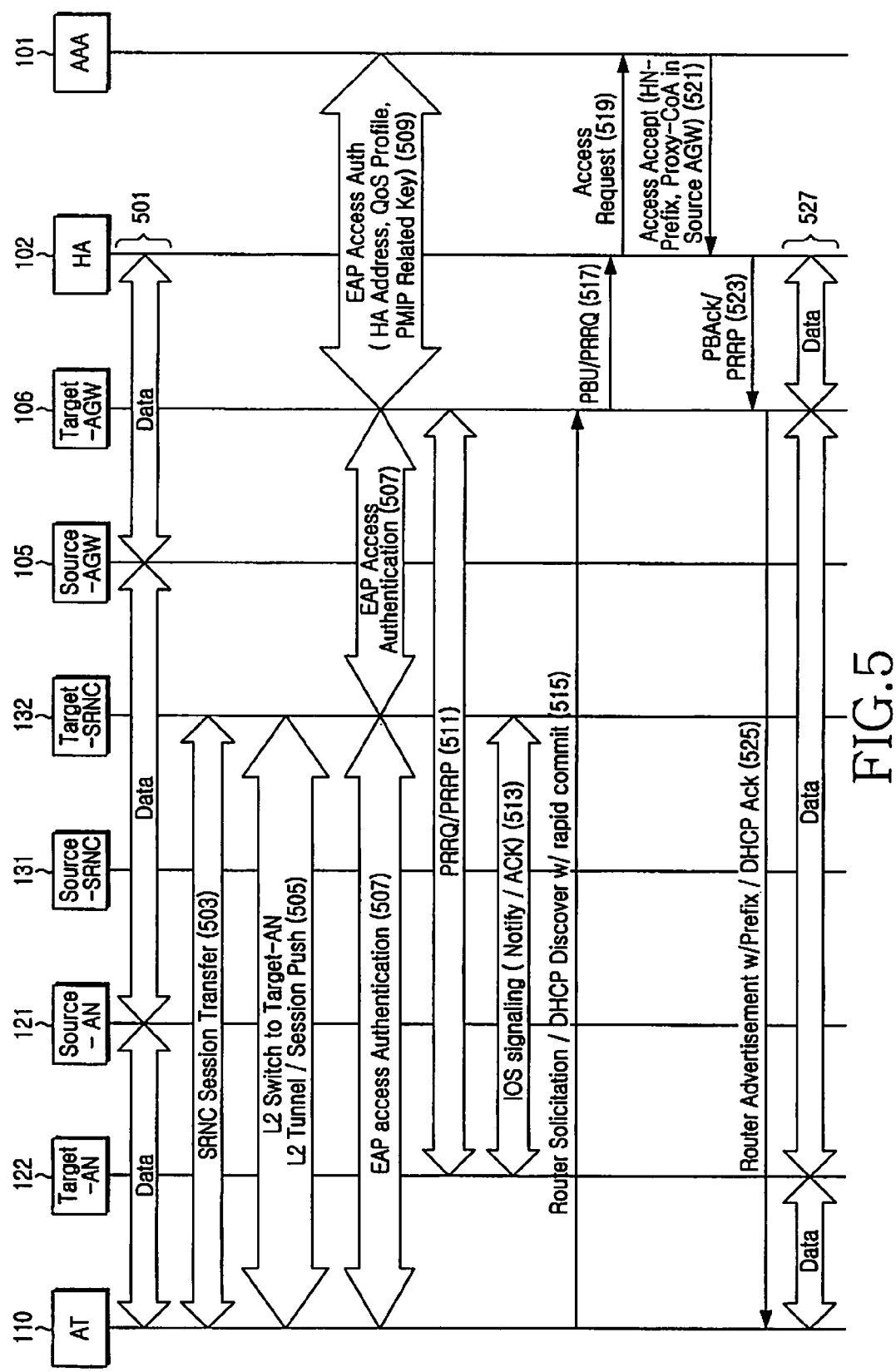
FIG. 5 is a message flow diagram illustrating a mobility management procedure for an AT according to a second exemplary embodiment of the present invention.

FIG. 5 is a message flow diagram illustrating a mobility management procedure for an AT according to the second exemplary embodiment of the present invention. It will be assumed herein that the AT 110 performs a handoff from the NW1 141 to the NW2 143. However, the procedure of FIG. 5 can be easily applied even to environments where similar mechanisms are used, i.e., to another network system where PMIP and an interface with AAA are supported.

Referring to FIG. 5, in step 501, HA 102, and Source-AN 121 and Source-AGW 105 of the NW1 141, which is a source network in which the AT 110 was located before the AT 110 performs a handoff, takes part in data communication. In case of UMB, data communication is performed through a GRE tunnel between the Source-AGW 105 and the Source-AN 121. Step 501 represents an operation performed before the AT 110 performs a handoff, and step 503 corresponds to an operation performed when the AT 110 starts its handoff to the NW2 143.

In step 503, the AT 110 requests Target-SRNC 132 to include Target-AN 122 of the NW2 143 in an active set, and the Target-SRNC 132 fetches, from Source-SNRC 131, session information. In other words, when the AT 110 has entered from the source network to the target network, the Source-SRNC 131 delivers session information to the Target-SRNC 132 at the request of the AT 110. In step 505, the AT 110 carries out L2 fast switching to the Target-AN 122, and data transmission continues between the Target-AN 122 and the source Source-AN 121 through an L2TP tunnel. Thereafter, the Target-SRNC 132 sends session information to the Target-AN 122. That is, as the AT 110 switches to the Target-AN 122, the Target-SRNC 132 sends the session information to the Target-AN 122.

In steps 507 and 509, an EAP access authentication process is performed in which AT 110, Target-SRNC 132, Target-AGW 106 and AAA 101 are involved. Steps 507 and 509 are steps with which several procedures are sequentially associated. It is not that step 507 is followed by step 509. Instead, steps 507 and 509 are performed in one large procedure. That is, in this process, AT 110, Target-SRNC 132, Target-AGW 106 and AAA 101 repeated several times in order of steps 507→509→507→509→507→509→507. The reason why step 509 is represented separately from step 507 in FIG. 5 is for the process in which the Target-AGW 106 receives information stored in the AAA 101 in the information related to the AT 110 in order to perform seamless communication possible between the AAA 101 and the Target-AGW 106 even in the situation where the AT 110 is performing handoff.

For example, the AT-related information can include an HA address, a QoS profile, a PMIP-related key, etc. An example of the PMIP-related key can include a Proxy Mobile Node-Access Network-Root Key (PMN-AN-RK). The PMN-AN-RK is a root key necessary for generating Proxy Mobile Node-Access Network-Home Agent (PMN-AN-HA), which is a PMIP key necessary for establishing a PMIP tunnel used between the Source-AGW 105 and the Source-AN 121 of the source network where the AT 110 was located before the AT 110 performs a handoff. Since a detailed generation method and procedure thereof departs from the scope of the present invention, a description thereof will be omitted.

In step 511, in order to establish a signaling interface between the Target-AN 122 and the Target-AGW 106 of the target network to which the AT 110 will perform a handoff, the Target-AN 122 sends a PRRQ message to the Target-AGW 106, and receives a PRRP message from the Target-AGW 106 in response thereto, thereby setting information necessary for future data communication, e.g., a GRE key. Step 511 represents a process of performing a proxy registration procedure for establishing a PMIP interface between the Target-AN 122 and the Target-AGW 106.

In step 513, the Target-AN 122 notifies the Target-SRNC 132 or the Source-AN 121 of an address of the Target-AGW 106 and the GRE key, and the Target-SRNC 132 or the Source-AN 121 sends an ACK message to the Target-AN 122 in reply to the notification, i.e., the Target-AN 122 exchanges a message for establishing an interface to the Target-AGW 106, with the Target-SRNC 132.

In step 515, the AT 110 sends a different message to the Target-AGW 106 according to whether the AT 110 is an IPv4 AT or an IPv6 AT. For IPv4, the AT 110 sends a DHCP Discover with Rapid Commit message, notifying the Target-AGW 106 that an interface is established between the Target-AN 122 and the Target-AGW 106 and the Target-AGW 106 should establish an interface between the Target-AGW 106 and the HA1 102. However, the AT 110, which uses IPv6, sends a Router Solicitation message, or a triggering message, to the Target-AGW 106 to notify the Target-AGW 106 that an interface is established between the Target-AN 122 and the Target-AGW 106, and there is a need to establish an interface between the Target-AGW 106 and the HA 102.

In step 515, the AT 110 sends, to the Target-AGW 106, an interface establishment triggering message indicating that an interface must be established between the Target-AGW 106 and the HA1 102.

In step 517, the Target-AGW 106 sends, to the HA1 102, a PBU message or a PRRQ message, requesting proxy registration on behalf of the AT 110, in order to manage the movement of the AT 110.

The Target-AGW 106 determines whether the Target-AGW 106 will send the PBU message or the PRRQ message, according to whether the Target-AGW 106 uses IPv4 or IPv6 as an interface between the Target-AGW 106 and the HA1 102. If the network supports PMIPv4 as the interface between the Target-AGW 106, and the HA1 102 uses IPv4, the Target-AGW 106 sends the PRRQ message to the HA1 102. If the network supports PMIPv6 as the network uses IPv6, the Target-AGW 106 sends the PBU message to the HA1 102.

In step 519, the HA1 102 sends an Access Request message to the AAA 101 with respect to PMIP establishment, and receives an Access Accept message from the AAA 101 in response to the Access Request in step 521, and the Access Accept message includes therein at least one of HN-Prefix information, which is information necessary for managing mobility of the AT 110 by the Target-AGW 106, and information such as a Proxy CoA at the Source-AGW 105 to which the AT 110 was belonging before it performs a handoff.

In PMIP, since the Target-AGW 106 sends, to the HA1 102, a registration request for the AT 110 on behalf of the AT 110 and an address of the AGW1 105 (or AGW2 106) is registered in a database of a binding cache for the AT 110, the address of the AGW 105 (106) is called a 'Proxy CoA'.

In step 523, the Target-AGW 106 receives, from the HA1 102, a response message for proxy registration as a response message to the message for requesting proxy registration. In this case, when the AT 110 uses IPv6, the Target-AGW 106 receives a PBAck message as the response message for proxy registration, and when the AT 110 uses IPv4, the Target-AGW 106 receives a PRRP message.

The response message for proxy registration, which the HA1 102 sends to the Target-AGW 106 in step 523 in response to step 521, includes therein at least one of an HN-Prefix and information such as a Proxy CoA at the Source-AGW 105 to which the AT 110 was belonging before the AT 110 performs a handoff.

Using the Proxy CoA at the Source-AGW 105, the Target-AGW 106 can acquire address information of the Source-AGW 105 to which the AT 110 was belonging before handoff of the AT 110. If the Target-AGW 106 knows an address of the Source-AGW 105 to which the AT 110 was belonging before handoff of the AT 110, the Target-AGW 106 can send, to the Source-AGW 105, a request for information necessary for the handoff, and acquire the necessary information therefrom. In step 525, the Target-AGW 106 sends a different message to the AT 110, according to whether the AT 110 supports IPv4 or IPv6. If the AT 110 supports IPv4, the Target-AGW 106 includes, in a DHCP Acknowledgement with Rapid Commit message, the HoA that the AT 110 was using in the Source-AGW 105 before the handoff, and sends the message to the AT 110 in response to the DHCP Discover with Rapid Commit message of step 515, thereby supporting a seamless service, even during a handoff of the AT 110.

However, if the AT 110 uses IPv6, the Target-AGW 106 includes HN-Prefix in a Router Advertisement message and sends the Router Advertisement message to the AT 110, in response to the Router Solicitation message, so that the AT 110 can generate the same address as the AT's HoA that the AT 110 was using in the Source-AGW 105 of the NW1 141 (source network) even though the AT 110 accesses the NW2 143 (target network), thereby supporting a seamless service even during a handoff of the AT 110. In step 527, when the handoff procedure of steps 503 through 525 is completed, data communication between the AT 110 and the HA1 102 is available through Target-AN 122, Target-AGW 106, and HA1 102, i.e., in step 525, the Target-AGW 106 transfers the HoA of the AT 110 and the HN-Prefix information of the AT 110 to the AT 110 in response to the triggering message of step 515.

Figure 6:
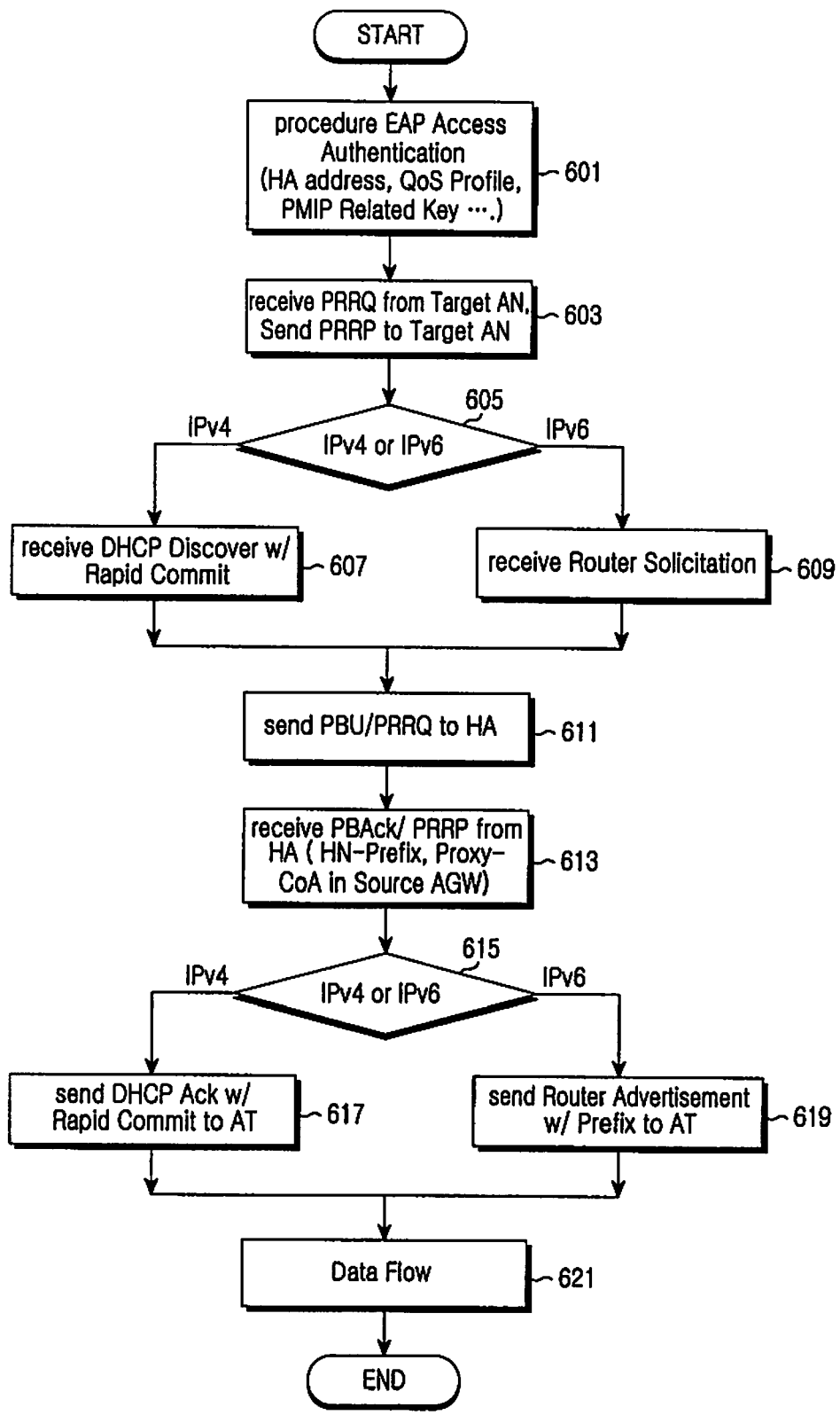
FIG. 6 is a flowchart illustrating an operation of a target AGW according to the second exemplary embodiment of the present invention.

FIG. 6 is a flowchart illustrating an operation of a target AGW according to the second exemplary embodiment of the present invention. The target AGW refers to the Target-AGW 106, which is an AGW of the target network to which the AT 110 will perform a handoff.

In step 601, the Target-AGW 106 acquires information such as a home agent address, a user QoS profile, and a PMIP-related key (for example, a PMIP Root Key (PMN-AN-RK) used between AN and AGW) through an EAP access authentication process with the AAA 101.

In step 603, the Target-AGW 106 receives, from the Target-AN 122, a PRRQ message for establishing a PMIP interface between the Target-AN 122 and the Target-AGW 106, and the Target-AGW 106 sends a PRRP message to the Target-AN 122 in response to the PRRQ message.

In step 605, when a tunnel established as an interface is activated between the Target-AN 122 and the Target-AGW 106, the Target-AGW 106 proceeds to step 607 or 609 according to whether the AT 110 uses IPv4 or IPv6, and then performs a corresponding operation.

If the AT 110 uses IPv4, in step 605, the Target-AGW 106 proceeds to step 607 where the Target-AGW 106 receives a DHCP Discover with Rapid Commit message sent by the AT 110, perceiving that an interface is established between the Target-AN 122 and the Target-AGW 106 and there is a need to establish an interface between the Target-AGW 106 and the HA 102.

However, if the AT 110 uses IPv6 in step 605, the Target-AGW 106 proceeds to step 609 where the AT 110 receives a Router Solicitation message sent by the AT 110, perceiving that a tunnel is established between the Target-AN 122 and the Target-AGW 106 and there is a need to establish an interface between the Target-AGW 106 and the HA 102.

In step 611, for management of the movement of the AT 110, the Target-AGW 106 sends, to the HA1 102, a PBU message or a PRRQ message as a message for requesting a proxy registration according to the message received in step 607 or 609 on behalf of the AT 110. The Target-AGW 106 determines whether the Target-AGW 106 will send the PBU message or the PRRQ message, depending on whether the Target-AGW 106 uses IPv4 or IPv6 as an interface between the Target-AGW 106 and the HA 102. When the network supports PMIPv4 as the Target-AGW 106 uses IPv4, the Target-AGW 106 sends the PRRQ message, and when the network supports PMIPv6 as it uses IPv6, the Target-AGW 106 sends the PBU message.

In step 613, the Target-AGW 106 receives, from the HA1 102, a response message for proxy registration in response to the message for requesting proxy registration. The Target-AGW 106 receives the PRRP message in response to the PRRQ message when the Target-AGW 106 uses IPv4 for an interface between the Target-AGW 106 and the HA1 102, and the Target-AGW 106 receives the PBAck message in response to the PBU message when the Target-AGW 106 uses IPv6. The response message that the Target-AGW 106 has received in step 613 includes therein at least one of an HN-Prefix and a Proxy CoA at the Source-AGW 105. The Proxy CoA at the Source-AGW 105, which is an address of the Source-AGW 105, refers to a CoA where the Source-AGW 105 is registered in the HA 102.

In PMIP, since the AGW1 105 (or AGW2 106) sends a registration request for the AT 110 to the HA 102 on behalf of the AT 110, an address of the AGW1 105 (or AGW2 106, respectively) is registered in a database of the binding cache for the AT 110 in the HA 102, so the Proxy CoA at the Source-AGW 105, stated in step 613, is called a Proxy CoA at the AGW1 105 (or AGW2 106, respectively).

Therefore, if the Target-AGW 106 knows an address of the Source-AGW 105, the Target-AGW 106 can send a request for necessary handoff information to the Source-AGW 105 and acquire the handoff information therefrom.

In step 615, the Target-AGW 106 proceeds to step 617 or 619 according to whether the AT 110 uses IPv4 or IPv6. If the AT 110 uses IPv4, the Target-AGW 106 proceeds to step 617 where the Target-AGW 106 includes, in a DHCP Acknowledgement with Rapid Commit message, the HoA that the AT 110 was using in the Source-AGW 105, and sends the message to the AT 110, thereby supporting a seamless service even during a handoff of the AT 110.

However, if the AT 110 uses IPv6, the Target-AGW 106 proceeds to step 619 where the Target-AGW 106 sends, to the AT 110, a Router Advertisement message with an HN-Prefix included, so that the AT 110 can generate the same address as the HoA the AT 110 was using in the Source-AGW 105, thereby supporting a seamless service even during a handoff of the AT 110. When the handoff procedure of steps 601 to 619 is completed, the Target-AGW 106 can perform data communication with the AT 110 via the Target-AN 122 and the HA 102 in step 621.

As is apparent from the foregoing description, the present invention can resolve the call setup delay problem for data communication in performing a registration process for use of Mobile IP when the AT using Mobile IP moves, and can also resolve the time delay problem occurring in call re-setup when the AT moves to another AN. In order to resolve theses problems, the present invention efficiently perform a call setup and security process in the network using the same access technology or in the mobile communication system using different access technologies based on the PMIP and the AAA server, thereby rapidly and efficiently managing mobility of the AT and performing data communication.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for managing mobility of an Access Terminal (AT) in a mobile communication system using a Proxy Mobile Internet Protocol (PMIP), the method comprising:
   as the AT performs a handoff from a source network to a target network, delivering, by a target Signaling Radio Network Controller (SRNC) of the target network, session information of the AT, acquired from a source SRNC of the source network, to a target Access Network (AN) of the target network;
   performing an access authentication process between the AT and an Authentication, Authorization and Accounting server (AAA);
   after the access authentication process, performing, by the target AN to which the AT will perform a handoff, a proxy registration procedure for establishing a PMIP interface, with a target Access Gateway (AGW) of the target network;
   sending, by the AT, to the target AGW an interface establishment triggering message indicating a need to establish an interface between the target AGW and a Home Agent (HA);
   sending, by the target AGW, a message for requesting a proxy registration to the HA for mobility management for the AT;
   sending, by the HA, an access request message associated with PMIP establishment to the AAA;
   receiving, by the HA, an access accept message from the AAA in response to the access request message; and
   sending, by the HA, a response message for the proxy registration, to the target AGW, in response to the message for requesting proxy registration.

2. The method of claim 1, wherein when an interface between the target AGW and the HA uses Internet Protocol version 4 (IPv4), the interface establishment triggering message is a Dynamic Host Configuration Protocol (DHCP) Discover with Rapid Commit message, and when the interface between the target AGW and the HA uses Internet Protocol version 6 (IPv6), the interface establishment triggering message is a router solicitation message.

3. The method of claim 1, wherein when the interface between the target AGW and the HA uses IPv4, the message for requesting proxy registration is a Proxy Registration Request (PRRQ) message, and when the interface between the target AGW and the HA uses IPv6, the message for requesting proxy registration is a Proxy Binging Update (PBU) message.

4. The method of claim 1, wherein the access accept message includes at least one of Home Network-Prefix (HN-Prefix) information necessary for managing mobility of the AT and a Care of Address (CoA) at a source AN.

5. The method of claim 1, wherein the response message for proxy registration is a Proxy Binding Acknowledge (PBAck) message when the AT uses IPv6, and the response message for proxy registration is a Proxy Registration Response (PRRP) message when the AT uses IPv4.

6. The method of claim 1, further comprising:
    after performing the access authentication process, exchanging, by the target AN, a message for interface establishment, with the target AGW.

7. The method of claim 1, further comprising:
    sending, by the target AGW, a Home of Address (HoA) of the AT or HN-Prefix information of the AT to the AT in response to the interface establishment triggering message.

8. A system for managing mobility of an Access Terminal (AT) in a mobile communication system using a Proxy Mobile Internet Protocol (PMIP), the system comprising:
    a target Signaling Radio Network Controller (SRNC) for, as the AT performs a handoff from a source network to a target network, delivering session information of the AT, acquired from a source SRNC of the source network, to a target Access Network (AN) of the target network;
    an Authentication, Authorization and Accounting server (AAA) for performing an access authentication process with the AT;
    a target Access Gateway (AGW) of the target network for, after the access authentication process, performing, with the target AN, a proxy registration procedure for establishing a PMIP interface, and receiving from the AT an interface establishment triggering message indicating a need to establish an interface with an HA; and
    the Home Agent (HA) for performing mobility management for the AT, receiving from the target AGW a message for requesting a proxy registration for mobility management for the AT, sending an access request message associated with PMIP establishment to the AAA, receiving an access accept message in response to the access request message, and sending a response message for the proxy registration to the target AGW in response to the message for requesting the proxy registration.

9. The system of claim 8, wherein when an interface between the target AGW and the HA uses Internet Protocol version 4 (IPv4), the interface establishment triggering message is a Dynamic Host Configuration Protocol (DHCP) Discover with Rapid Commit message, and when the interface between the target AGW and the HA uses Internet Protocol version 6 (IPv6), the interface establishment triggering message is a router solicitation message.

10. The system of claim 8, wherein when the interface between the target AGW and the HA uses IPv4, the message for requesting proxy registration is a Proxy Registration Request (PRRQ) message, and when the interface between the target AGW and the HA uses IPv6, the message for requesting proxy registration is a Proxy Binging Update (PBU) message.

11. The system of claim 8, wherein the access accept message includes at least one of Home Network-Prefix (HN-Prefix) information necessary for managing mobility of the AT and a Care of Address (CoA) at the source AN.

12. The system of claim 8, wherein when the AT uses IPv6, the response message for proxy registration is a Proxy Binding Acknowledge (PBAck) message, and when the AT uses IPv4, the response message for proxy registration is a Proxy Registration Response (PRRP) message.

13. The system of claim 8, wherein after performing the access authentication process, the target AN exchanges a message for interface establishment with the target AGW.

14. The system of claim 8, wherein the target AGW sends a Home of Address (HoA) of the AT or HN-Prefix information of the AT to the AT in response to the interface establishment triggering message.

* * * * *